US005734873A

United States Patent [19]
Lobodzinski et al.

[11] Patent Number: 5,734,873
[45] Date of Patent: Mar. 31, 1998

[54] DISPLAY CONTROLLER WITH ACCELERATED DRAWING OF TEXT STRINGS

[75] Inventors: Mark A. Lobodzinski, Houston; Patrick A. Harkin, Spring, both of Tex.

[73] Assignee: Compaq Computer Corporation, Houston, Tex.

[21] Appl. No.: 482,014

[22] Filed: Jun. 7, 1995

[51] Int. Cl.⁶ .................................................. G06T 1/60
[52] U.S. Cl. ..................... 395/509; 395/110; 395/167; 395/501; 345/192
[58] Field of Search ........................ 395/110, 507, 395/509, 167, 170, 171, 501; 345/192, 194, 195, 185, 189; 382/298, 301

[56] References Cited

U.S. PATENT DOCUMENTS

| 4,947,342 | 8/1990 | Katsura et al. | 345/192 |
| 5,021,974 | 6/1991 | Pisculli | 345/195 |

Primary Examiner—Kee M. Tung
Attorney, Agent, or Firm—Vinson & Elkins L.L.P.

[57] ABSTRACT

A display controller includes a text engine which stores font information, including image and width information, in a unused portion of the frame buffer. A character string comprising width vectors and indices which point to the characters to be drawn, is passed to the display controller from the driver software. Once the character string is received, the text engine draws the indicated characters by reference to the font information previously stored in the character information memory by the driver, allowing the operating system to continue operations while the text string is being drawn to the viewport of the frame buffer.

21 Claims, 4 Drawing Sheets

DISPLAY CONTROLLER WITH ACCELERATED DRAWING OF TEXT STRINGS

TECHNICAL FIELD OF THE INVENTION

This inventions relates in general to computers and, more particularly, to a display controller having accelerated text features.

BACKGROUND OF THE INVENTION

The speed at which a personal computer operates is dependent upon a number of factors. Naturally, the speed of the microprocessor has a significant influence on the operation speed of the overall computer system. Next to processor speed, in many cases, the graphic subsystems has the most influence on the performance on the overall computer system. This is particularly, true when a graphical operating environment, such as MICROSOFT WINDOWS (by Microsoft Corporation of Redmond, Wash.), is used. In order to boost performance, most modern-day computers use a local video bus, which has a higher data bandwidth than the main peripheral bus and an accelerated display controller which increases the speed of certain operations. An accelerated display controller allows the display controller to display selected operations at high speed rather than using the CPU (central processing unit) to perform the operation. Hardware acceleration improves the operation of the computer system in two ways: (1) the CPU no longer needs to perform low-level operations handled by the display controller and (2) the data bandwidth used by certain operations is greatly reduced, resulting in less bus traffic.

Most modern accelerated display controllers provide functions to accelerate common operations, such as line draws and bit-block transfers (BITBLTS) by providing specific engines which handle those operations. One area which remains the problem is the drawing of strings of characters. In WINDOWS, the driver which communicates with the display controller is responsible for drawing of characters. The driver obtains bitmaps from WINDOWS and sends the bitmaps to the display controller to be written to the frame buffer at an appropriate location. The driver may convert the bitmap to a more appropriate format prior to sending the bitmap information to the display controller. Nonetheless, text drawing requires significant bandwidth on the bus and is a generally slow operation.

Therefore, a need has arisen for a display controller which accelerates the drawing of text to a computer display.

SUMMARY OF THE INVENTION

The present invention provides a display controller for enhanced display of text information. Font information defining the images of one or more characters in one or more font sets is stored in a first memory. String information defining a string of characters to be output to a computer display is stored in a second memory. Text drawing circuitry retrieves string information for each character in the string from the second memory and retrieves font information for each retrieved character from the first memory. This information is used to generate an output for each retrieved character.

The invention provides significant advantages over the prior art. First, a text draw operation can be performed with greater speed, since the information being passed from the driver to the display controller is greatly reduced once the font set is stored in the display controller. Second, once the character string has been received, the operating system can be told that the drawing is finished so that the operating system can perform other operations while the text is being drawn. Third, the bounding box can be drawn with all calculations performed by the text engine.

BRIEF DESCRIPTION OF THE DRAWINGS

For a more complete understanding of the present invention, and the advantages thereof, reference is now made to the following descriptions taken in conjunction with the accompanying drawings, in which:

FIG. 3b illustrates a format for storing character information in the embodiment of FIG. 3a;

FIG. 4b illustrates a format for storing character information in the embodiment of FIG. 4a;

DETAILED DESCRIPTION OF THE INVENTION

The preferred embodiment of the present invention and its advantages are best understood by referring to FIGS. 1–7 of the drawings, like numerals being used for like and corresponding parts of the various drawings.

Figure 1:
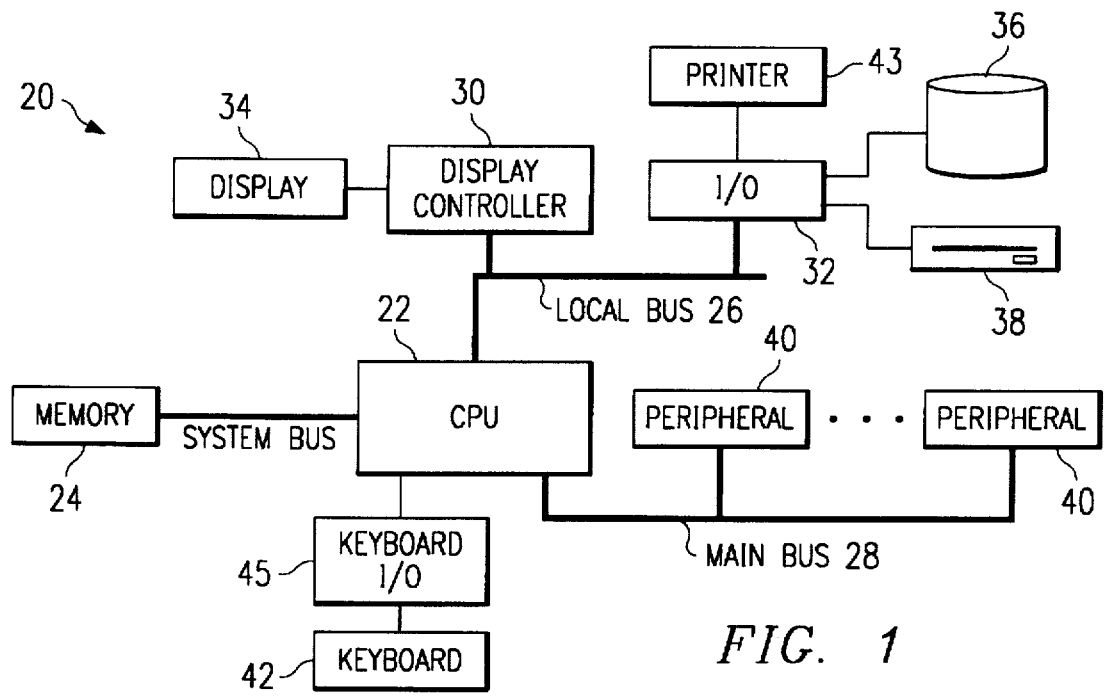
FIG. 1 illustrates a computer system incorporating the display controller of the present invention.

FIG. 1 illustrates a block diagram of a computer system 20. The computer system 20 includes a microprocessor (or central processing unit) 22, coupled to memory 24, a local bus 26 and a main peripheral bus 28. The display controller 30 and I/O circuitry 32 are coupled to a local bus 26. The display 34 (such as a CRT monitor or LCD flatpanel) is coupled to the display controller 30. A hard disk 36 and floppy disk 38 are coupled to the I/O circuitry 32. A plurality of peripherals 40 may be coupled to the main bus. A keyboard 42 is coupled to the CPU 22 through keyboard interface 45. A printer 43 is also coupled to I/O circuitry 32. The computer system 20 of FIG. 1 is an exemplary embodiment for a high-performance computer system. Many computer systems vary from the architecture shown in FIG. 2 and the invention described herein would apply to various architectures. Further, the architecture shown in FIG. 1 is a basic architecture and many of the details have been removed for illustrative purposes.

Figure 2:
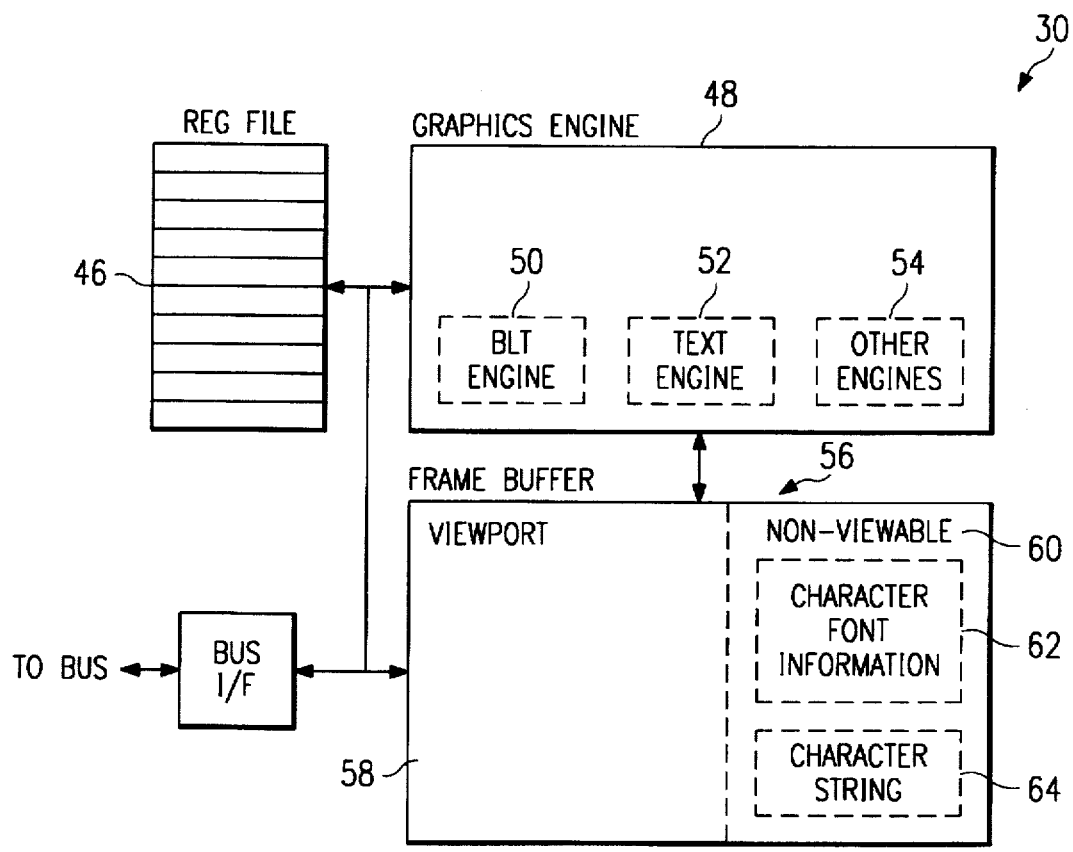
FIG. 2 illustrates a block diagram of the display controller.

FIG. 2 illustrates a block diagram of the display controller 30 for the present invention. The display controller 30 includes a register file 46 comprising a plurality of addressable registers or other memory circuits, a graphics engine 48, including a BLT (block transfer engine) 50, a text engine 52, and other acceleration engines 54. The graphics engine 48 is coupled to the register file 46 and to a frame buffer 56. The frame buffer has a viewable region (viewport) 58, the configuration of which varies depending on the resolution and color depth of the current display and a non-viewable region 60 in which character font information and string information are stored. While the character information and string information are shown as a portion of the non-viewable region 60 of the frame buffer 56, they could similarly be stored in a separate memory. However, since the frame buffer generally has a non-viewable portion in excess of the amount needed to store the character information and the string information, it is efficient to store such information in the frame buffer. Other information (not shown) may also be stored in the frame buffer.

The text engine 52 is intended to accelerate the drawing of strings of characters. The driver, which is a software program executed by the processor 22 and acts as an interface between the operating system (i.e., MICROSOFT WINDOWS) and the display controller 30, sends image data defining one or more fonts to the display controller to be stored in the unused portion 60 of the frame buffer 56. This section of the frame buffer 56 is shown in FIG. 2 as character font information memory 62. Each font set may contain a group of up to 64K monochrome images representing a character set. The driver maintains a log of which fonts are stored in the character font information memory 62 and the starting address of each font. Once a font is stored in the character font information memory 62, the driver can initiate drawing of a character string by transferring the character string data to the frame buffer and commanding the display controller to begin the text draw opertion. Character strings, which comprise width vectors and indexes (which point to the image data for a character within a font set) are stored in the string information memory 64. The text engine reads through the string of character indexes and width vectors, calculates the address of the character, updates the X-coordinate in the viewport 58 to which the font will be written and instructs the BLT engine 50 to perform a screen-to-screen color expanded BLT (SS Expand BLT) of the monochrome image.

An SS Expand BLT performs the following operation on a monochrome image (i.e., an image where each pixel is represented by a "0" or "1"). For each pixel represented by a "1", the foreground color (stored in a register in the register file 46) is written to appropriate location in the viewport 58. If the pixel is represented by a "0", then the background color is written to the appropriate location in the frame buffer memory 56. In the preferred embodiment, the text string is always drawn "transparently", i.e., pixels represented by a "0" in the monochrome image are not written to the viewport 58, thereby leaving the present image intact. This prevents portions of a first character from being over-ridden by a SS Expand BLT of a subsequent character. However, where an opaque background is desired, a single rectangular bounding box covering the width and height of a character string can optionally be drawn in the background color, as will be described in greater detail hereinbelow.

The driver supplies the character font information and the string data to the display controller 30. For each text operation, the driver sends the data indicating which characters are to be drawn and the desired spacing between characters. In the preferred embodiment, character font information is sent only when the font to be drawn is not currently in the frame buffer. When a font is unavailable, the image data for entire font set is sent to the display controller.

Registers associated with the text engine are described hereinbelow. The register addresses are for illustrative purposes only.

TABLE I

TEST ENGINE REGISTERS

| Address | Name | Description | Bit Information |
|---------|------|-------------|-----------------|
| 58–5Bh | TXE Font Address | Linear starting dword address (dword address = Byteaddress shifted right by 2 places) of character font set to be used for string operation. Lower 4 bits are ignored, forcing fonts to be aligned in 16 Dword boundaries. Up to 256 characters can be stored in one font. Same register BLT source address. | 31–0: Linear starting dword address of character font set |
| 5C–5Dh | TXE Destination X | Onscreen X location for text string to be drawn, same register as BLT dest X | 15–0: Legal range −2048, +2047. Onscreen X location for text string to be drawn. Same register as BLT dext X |
| 5E–5Fh | TXE Destination Y | Onscreen Y location for text string to be drawn. Register shared with BLT dest Y | 15–0: Legal range −2048, +2047 |
| 60–61h | TXE Clip Left X | Left Clip location for Text Engine, Register shared with right_x0 | 15–0: Legal range −2048, +2047. Pixels with X coordinates < than this will not be drawn. Must be greater than clip left x. Same register as right_x0 |
| 62–63h | TXE Clip Right X | Right Left Clip location for Text Engine. Register shared with right_y0 | 15–0: Legal range −2048, +2047. Pixels with X coordinates >= than thsis will not be drawn. Must be greater than clip left x |
| 64–66h | TXE String Address | Linear dword address of character indexes and width vectors for string to be drawn. Character indexes are unsigned bytes, width vectors are signed 16 bit words move from the start x of one character to the next. Same register as right_y1, right_x1 | and test the text engine how far to |
| 68h | TXE Command Reg1 | Command and controls for text operation | 7: Reserved<br>6: TXE Use ROPS<br>1: text engine will use ROPS if they are |

TABLE I-continued

TEST ENGINE REGISTERS

| Address | Name | Description | Bit Information |
|---|---|---|---|
| | | | setup<br>0: text engine will not use ROPS<br>5–3: Character Font Pitch; Number of Dwords from one character font to the next. Larger values are useful for storing fonts vertically. The pitch should be equal to or greater than the actual size of the font.<br>543  Char Pitch  543  Char Pitch<br><br>000:  16 Dwords  100:  256 Dwords<br>001:  32 Dwords  101:  512 Dwords<br>010:  64 Dwords  110:  1024 Dwords<br>011:  128 Dwords  111:  RESERVED<br>2: Do Bounding Box- Set to 1 to fill background of text in with contents of the Background Color Register. The area filled will be a solid rectangle from the leftmost to the rightmost character.<br>1: Past Clip Continue |
| 6C–6Dh | TXE Height Register | Same register as BLT height | 7–0: Number of scanlines of Text to be drawn. |
| 6Eh | TXE Character Count | Same register as BLT width (low byte) | 7–0: Number of text glyphs to be drawn.<br>1–255: Valid values<br>0: Reserved. |
| 6Fh | TXE Char Offset | Same register as BLT width (high byte). Dword offset into every char drawn. Used for clipping off the top of the drawn string. The font offset may not be equal to or greater than the current font character size | 7–0: Number of Dwords to offset into each glyph in a string |

The text font address register points to the starting DWORD address of the character font set to be used for a string operation. The destination X-register and destination Y-register provide the coordinates of the lower-left corner of where the character should be drawn in the viewport 58. The clip left X and clip right X registers provide locations on the left and right side of the text string which will be clipped. The string address register defines the starting address for the text string information memory 64. The command register 1 provides various information. Importantly, this register specifies whether a bounding box is to be drawn and the number of Dwords (double words—32 bits) per character for the current font (see FIG. 5). The height register specifies how many scanned lines of data to draw for each character. The character count register specifies the number of characters to draw. The character offset register specifies an offset for clipping the top of the string.

In the preferred embodiment, sizes of individual character fonts can vary from 32 (width)×15 (height) to 255×32. The number of characters in a font set can be as high as 64K, but typical font sizes and the amount of available frame buffer memory will limit the actual number of characters in a font.

Figure 3A:
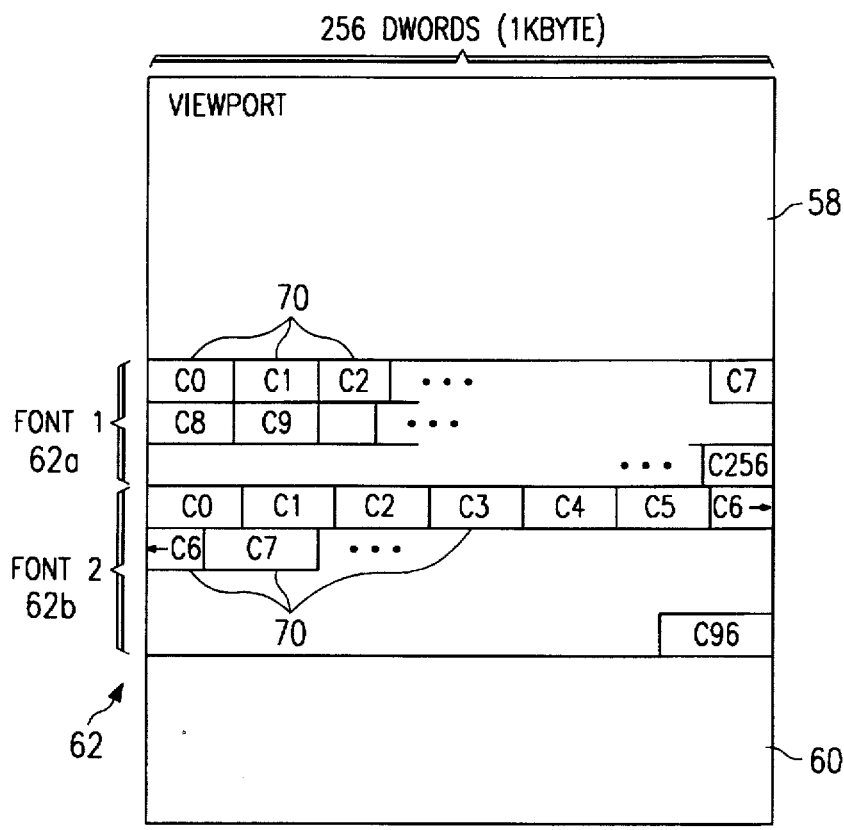
FIG. 3a illustrates memory allocation for the frame buffer in a first configuration.

FIG. 3a illustrates a first configuration of the frame buffer memory, assuming a two megabyte frame buffer at a resolution of 1024×768 and a 8-bit per pixel (8 bpp) color depth. In this configuration, since the resolution width is a power of 2, the viewport 58 can comprise a contiguous block of memory. The character font memory 62 comprises a portion of the frame buffer at addresses directly below the viewport memory 58. The character font memory 62 stores one or more font sets, labelled 62a and 62b. Each font set has image data sets 70 for a plurality of characters, identified by an index. For example, Character Index 0 could be an "A", Character Index 1 could be a "B", and so on.

Figure 3B:
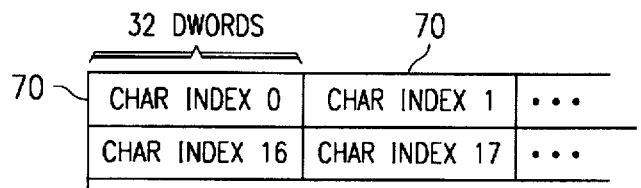

FIG. 3b shows a structure for a font set having images of 14 (width)×20 (height). This results in a Dword size of 21 Dwords. For ease of calculation, a "pitch" (address space between the start of image data of consecutive characters in a font set) of 32 DWORDs (the largest power of 2) is chosen for each character. It should be noted that in this configuration, individual characters can wrap from side-to-side of the frame buffer memory, since the addresses are contiguous.

Figure 4A:
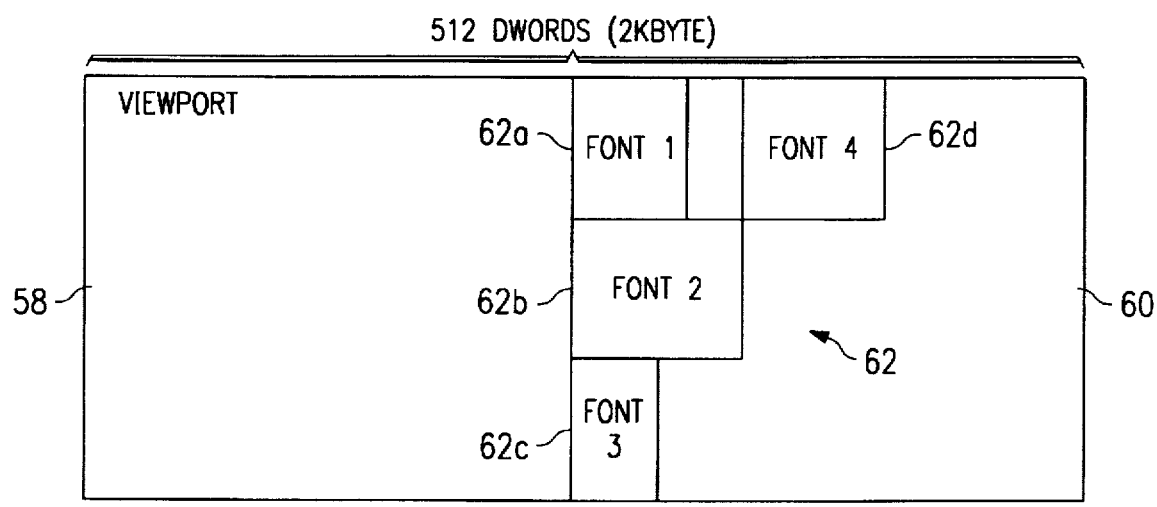
FIG. 4a illustrates memory allocation for the frame buffer in a second configuration.
Figure 4B:
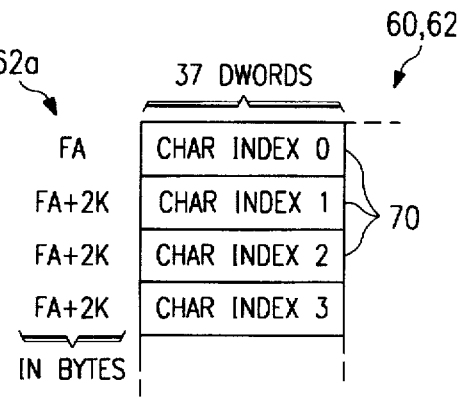

FIG. 4 illustrates a second configuration of the frame buffer memory, assuming a 2 megabyte frame buffer at a resolution of 1280×1024 and 8-bit per pixel colordepth. In this configuration, the off-screen memory 60 is to the side of the viewport 58. A plurality of font sets 62a–62d are shown in the non-viewable memory 60. The image sets 70 for each character in the font set are aligned vertically, rather than in a contiguous address space, as shown in FIGS. 3a–3b.

As an example, if font set 1 had characters whose image size was 30 W×36 H, 37 Dwords would be needed for each character in the font. Since the characters are aligned vertically, the pitch would equal to 512 Dwords (2K Bytes), i.e., the difference between the starting addresses of consecutive characters in the font, since each scanline of the viewport 58 starts on an address equal to a multiple of 512 Dwords. It should be noted that font sets in this configuration cannot wrap from the end of the frame buffer 56 to the top, since the pitch would then change between the character at the bottom of the frame buffer 56 to the next sequential character located at the top of the frame buffer 56.

Figure 5:
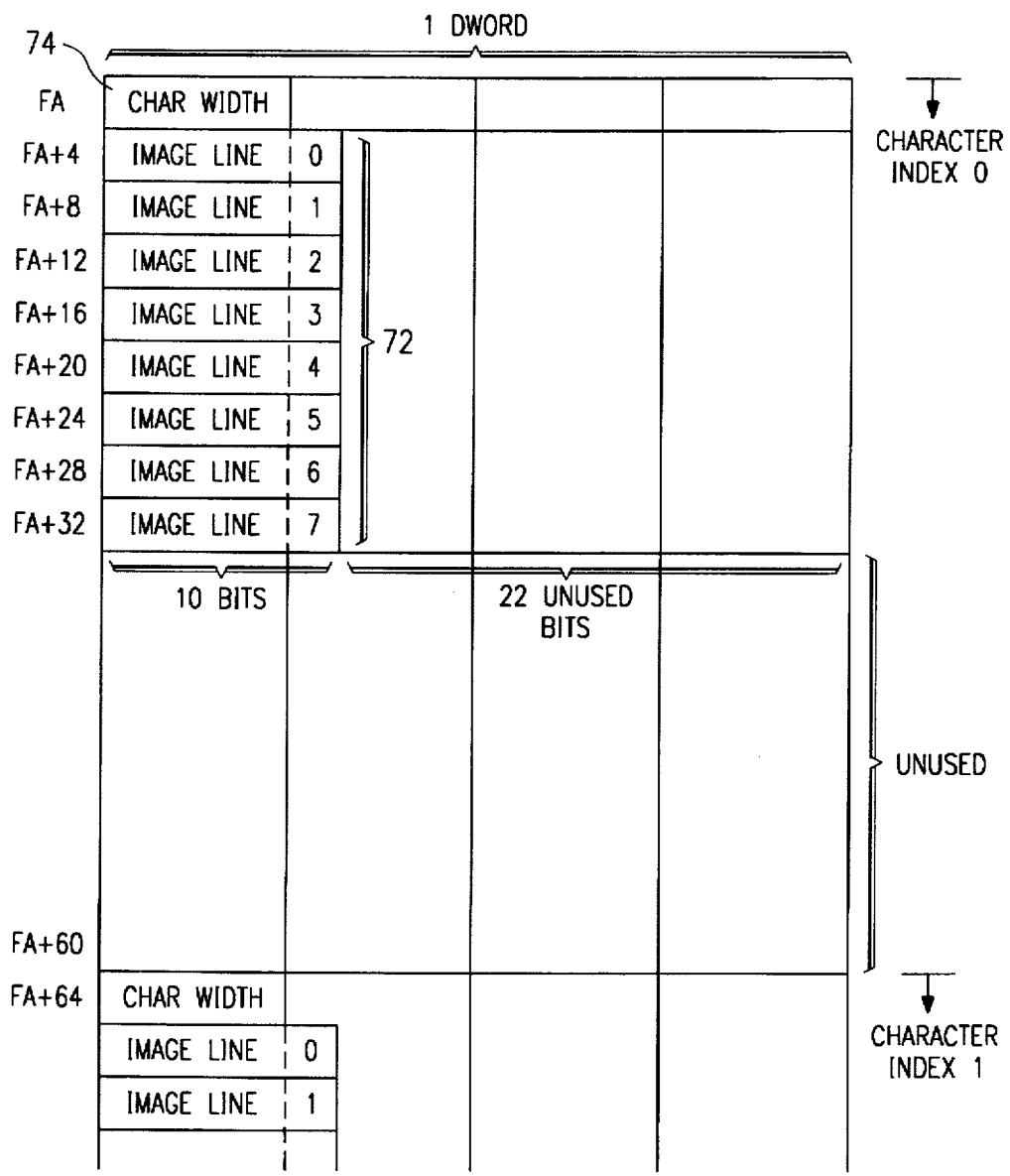
FIG. 5 illustrates a format for storing display information for each character.

FIG. 5 illustrates a memory structure for an individual image data set 70 corresponding to a single character. As an example, the font size is given as 10 W×8 H. Since each scanline of an image data set 70 starts on a Dword boundary in the preferred embodiment, 8 Dwords are used to store the image 72. In addition, the first Dword 74 of each image set 70 contains the pixel width of the character. Since nine Dwords are thus needed for the width and image data, the image set 70 shown in FIG. 5 has a pitch of 16 Dwords (64 bytes). Thus, in the described font set, the image set 70 at index=1 would have a starting address equal to FA+64, where FA is the starting address of the image set 70 at index=0.

acters in the character string 76 is stored in the character count register described above. The pseudo-code describing operation of the text engine 52 is provided hereinbelow.

```
If (do_bounding_box=1)
    Initialize:CURRENTX=Dest X,COUNT=0, RIGHTX=Dest X, LEFTX=Dest X
    Determine the size of the bounding box: (note: RIGHTX is the rightmost drawn pixel +1
    while LEFTX is leftmost drawn pixel.)
    LOOP1:
        Read WV(width vector) and CI(character Index) @ string address+COUNT
        Read CW(character width) @ fontaddress + CI*(font pitch)
        if CW > WV then (if CURRENTX+CW>RIGHTX then RIGHTX=CURRENTX+CW)
        else if CURRENTX+WV>RIGHTX then RIGHTX=CURRENTX+WV
        CURRENTX=CURRENTX+WV
        if CURRENTX<LEFTX then LEFTX=CURRENTX
        if CURRENTX>2048 OR CURRENTX<-2047 then LOOP1DONE
        COUNT=COUNT+1
        if COUNT == char_count then LOOP1DONE
        goto LOOP1
    LOOP1DONE:
        if (RIGHTCX>clip_right_x-1) RIGHTX=clip_right_x-1
        if (LEFTX<clip_left_x) LEFTX=clip_left_x
        blt_width=RIGHTX-LEFTX
    Now draw bounding box:
        PERFORM TRANSPARENT BLOCK WRITE FILL BLIT with BG color
            (note: curx register loaded with BLT distx, rx register loaded with BLT width)
Draw text string:
    Initialize: CURRENTX=DestinationX, COUNT=0
    LOOP2:
        write CURRENTX to BLT initial destination x register
        Read WV(width vector) and CI(character index)@string address+COUNT
        Read CW(character width)@fontaddress+CI*(font pitch)
        if (CURRENTX>clip_right_x-1)&(~past_clip_continu e) then LOOP2DONE
        if (CURRENTX>clip_right_x-1) SKIPDRAWING
        if (CURRENTX+CW<clip_left_x)&(~past_clip_continu e) then LOOP2DONE
        if (CURRENTX<clip_left_x) SKIPDRAWING
        if (CURRENTX+CW>=clip_right_x)&(CURRENTX<=clip_1 eft_x) then
            BLT width=clip_right_x-clip_left_x
        else if (CURRENTX+CW>=clip_right_x then BLT width=clip_right_x-CURRENTX
        else if (CURRENTX<clip_left_x) then BLT_width = CW-(clip_left_x-CURRENTX)
        else BLT width = CW
        if (CURRENTX<clip_left_x) then
            Write fontaddress+CI*(font pitch)+font_offset*32 +
                clip_left_x-CURRENTX to BLT initial source address
        else write fontaddress+CI*(font pitch)+font_offset*32 to BLT initial source address
        fo (CURRENTXZ<clip_left_x) then use clip_left_x as dest x
        else use CURRENTX as dest x
        PERFORM TRANSPARENT SS EXPAND BLITwith FG color
            (note: curx or clx register used as BLT dest x, rx register loaded with BLT width, inter
            and 1x register loaded with blt src address)
    SKIPDRAWING:
        CURRENTX=CURRENTX+WV
        if CURRENTX>2048 I CURRENTX<-2047 then LOOP2DONE
        COUNT=COUNT+1
        IF COUNT==char_count then LOOP2DONE
        goto LOOP2
    LOOP2DONE:
        reset start_bit
```

Figure 6:
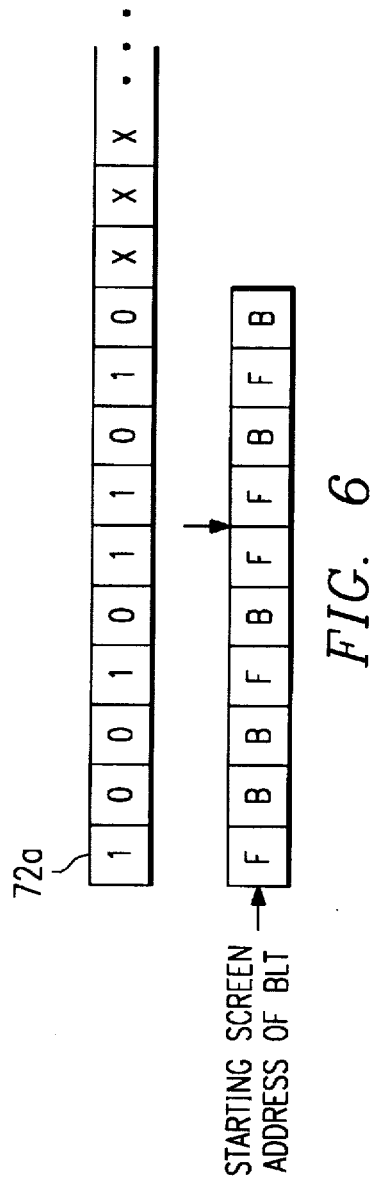
FIG. 6 illustrates image data for an exemplary character.

FIG. 6 illustrates the first line 72a of image data for an arbitrary character, using the character size shown in FIG. 5. As described hereinabove, bits equal to "1" are written to the frame buffer using an SS Expand BLT, bits equal to "0" are not written to the frame buffer.

Figure 7:
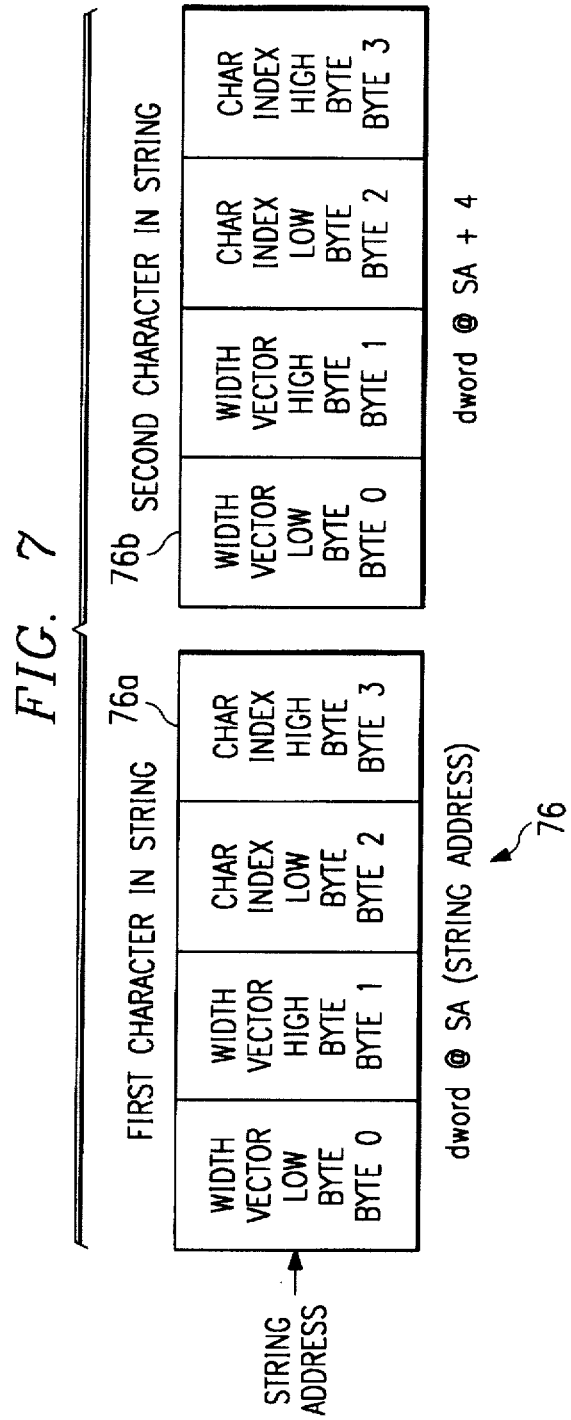
FIG. 7 illustrates a format for storing string data.

FIG. 7 illustrates the format for a character string 76 to be stored in the string information memory 64. The character string shown in FIG. 7 comprises two characters, referenced as 76a and 76b. Each character in the string includes 16-bit width vector and 16-bit character index. The character index points to a character in the current font set (a character string relates to a single font set). Hence, using the font set shown in FIG. 5, if the character index equalled "3", the address of the character would equal FA+64*3. The number of char- The first portion of the pseudo-code draws a bounding box (a box having the background color defined in the register file 46) if the appropriate status bit is set (bit 2 of the command register 1). The size of the bounding box is determined by adding the "effective" width of each character specified by the character string 76. The width vector of the character string 76 is used to space characters in the drawn text. For proportionally spaced fonts, the width vector may be smaller or larger than the actual width of the character. This allows narrow characters, such as "i", to be placed close to adjacent characters and allows an "o" to be placed partially underneath a "T" in the word "To". Accordingly, to find the size of the bounding box which will fit the character string, it is necessary to determine how far each character extends the length of the string. This is done in the portion of the pseudo-code labelled LOOP1.

After length of the bounding box is determined, the right and left edges are compared to clipping constraints, and the unclipped portion of the bounding box is drawn using a block-right-fill BLT with the background color.

After drawing the bounding box (if specified), the text string is drawn. In the pseudo-code, "CURRENTX", maintains the starting location of the next character image to be drawn. In routine LOOP2, the BLT destination register is prepared for performing the SS Expand BLT. The width vector from the character string 76 and the character width from the character font 70 are read by the text engine 52. It is then determined whether the character to be drawn is partially or fully clipped. If the character is partially clipped, the BLT registers are set to draw only the visible portion of the character. After performing the transparent SS Expand BLT as the foreground color, the variable CURRENTX is updated to point to the start of the next character to be drawn and the variable COUNT is incremented to point to the next character. When all characters have been drawn, the start bit is reset and the next operation can be performed by the display controller 30.

The present invention provides significant advantages over the prior art. First, a text draw operation can be performed with greater speed, since the information being passed from the driver to the display controller 30 is greatly reduced. Second, once the character string has been received, the operating system can be told that the drawing is finished so that the operating system can perform other operations while the text is being drawn. Third, the bounding box can be drawn with all calculations performed by the text engine.

Although the present invention and its advantages have been described in detail, it should be understood that various changes, substitutions and alterations can be made herein without departing from the spirit and scope of the invention as defined by the appended claims.

What is claimed is:

1. A display controller comprising:
   circuitry for receiving font information defining images of one or more characters in one or more font sets from a processor and for receiving string information defining a string of characters to be output to a computer display from said processor;
   a first memory in a first portion of a selectively configured frame buffer for storing said font information, wherein said selectively configured frame buffer is configured in response to a resolution of a viewable region;
   a second memory for storing said string information;
   text drawing circuitry for:
      retrieving string information for each character in said string from said second memory;
      retrieving font information for each retrieved character from said first memory; and
      generating an output for each retrieved character to the computer display.

2. The display controller of claim 1 wherein said circuitry for receiving font information and string information comprises a bus interface.

3. The display controller of claim 1 wherein said string information comprises an index indicating the character to be drawn.

4. The display controller of claim 3 wherein said string information further comprises width information defining the spacing between the retrieved character and an adjacent character.

5. The display controller of claim 1 wherein said font information includes bit-mapped image data for each character in the font set.

6. The display controller of claim 1 wherein said font information including width information for each character in the font set.

7. A computer system comprising:
   a processor;
   a memory coupled to said processor; and
   a display controller coupled to said processor, comprising:
      circuitry for receiving font information defining images of one or more characters in one or more font sets from said processor and for receiving string information defining a string of characters to be output to a computer display from said processor;
      a first memory for storing said font information in a first portion of a selectively configured frame buffer wherein said selectively configured frame buffer is configured in response to a resolution of a viewable region;
      a second memory for storing said string information;
      text drawing circuitry for:
         retrieving string information for each character in said string from said second memory;
         retrieving font information for each retrieved character from said first memory; and
         generating an output for each retrieved character to the computer display.

8. The computer system of claim 7 wherein said circuitry for receiving font information and string information comprises a bus interface.

9. The computer system of claim 7 wherein said string information comprises an index indicating the character to be drawn.

10. The computer system of claim 9 wherein said string information further comprises width information defining the spacing between the retrieved character and an adjacent character.

11. The computer system of claim 7 wherein said font information includes bit-mapped image data for each character in the font set.

12. The computer system of claim 7 wherein said font information including width information for each character in the font set.

13. A frame buffer, comprising:
   a viewable region for storing date to be displayed, said viewable region having a resolution;
   a non-viewable region for storing data not to be displayed, said non-viewable region including a character font memory for storing character font information and a string memory for storing string information, said frame buffer being selectively configured in response to said resolution of said viewable region.

14. The frame buffer of claim 13 wherein said character font information includes images of one or more characters in one or more font sets.

15. The frame buffer of claim 14 wherein said images of one or more characters have contiguous addresses in the character font memory if the non-viewable memory is located below the viewable memory.

16. The frame buffer of claim 14 wherein said images of one or more characters have vertically aligned addresses in the character font memory if the non-viewable memory is located to a side of the viewable memory.

17. A method drawing text in a computer system comprising the steps of:

creating a frame buffer that includes a viewable portion having a predetermined resolution;

selectively configuring a first non-viewable memory region of said frame buffer in response to the predetermined resolution of the viewable portion;

storing font information in the first non-viewable memory region of said frame buffer;

storing string information in a second non-viewable memory region of said frame buffer;

retrieving said string information from said second non-viewable memory region;

retrieving said font information from said first non-viewable memory region; and generating a visual output responsive to the font information retrieved from said first non-viewable memory region and the string information retrieved from said second non-viewable memory region.

18. The method of claim 17 wherein said step of storing, in a second memory of a display controller, string information defining a string of characters to be output to a computer display from said processor comprises the step of storing string information defining a string of characters to be output to a computer display from said processor in a second portion of the frame buffer memory.

19. The method of claim 17 wherein said step of storing, in a second memory of a display controller, string information defining a string of characters to be output to a computer display from said processor comprises the step of storing an index indicating a respective character to be drawn for each character in a string.

20. The method of claim 18 wherein said step of storing, in a second memory of a display controller, string information defining a string of characters to be output to a computer display from said processor further comprises the step of storing width information defining the spacing between adjacent characters.

21. The method of claim 17 wherein said step of storing, in a first memory of a display controller, font information defining the images of one or more characters in one or more font sets from a processor includes the step of storing bit-mapped image data for each character in a font set.

* * * * *

UNITED STATES PATENT AND TRADEMARK OFFICE
CERTIFICATE OF CORRECTION

PATENT NO : 5,734,873

DATED : March 31, 1998

INVENTOR(S) : Mark A. Lobodzinski, Patrick A. Harkin

It is certified that error appears in the above-identified patent and that said Letters Patent is hereby corrected as shown below:

Abstract - delete "information, in a unused", insert -- information, in an unused --.

Col. 1, ln. 17, delete "subsystems has the", insert -- subsystems have the --.

Col. 4, ln. 17, delete "ridden by a", insert -- ridden by an --.

Col. 5, ln. 56, delete "and a 8-bit", insert -- and an 8-bit --.

Col. 10, ln. 47, delete "for storing date", insert -- for storing data --.

Col. 12, ln. 10, delete "method of Claim 18", insert -- method of Claim 19 --.

UNITED STATES PATENT AND TRADEMARK OFFICE
CERTIFICATE OF CORRECTION

PATENT NO : 5,734,873

DATED : June 7, 1995

INVENTOR(S) : Mark A. Lobodzinski, Patrick A. Harkin

It is certified that error appears in the above-identified patent and that said Letters Patent is hereby corrected as shown below:

Columns 3 & 4, line 33, (Table I), correct as shown below (this is a continuation of the previous page):

| 62-63h | TXE Clip Right X | Right Left Clip location for Text Engine. Register shared with right_y0 | 15- 0: Legal range -2048, + 2047. Pixels with X coordinates >= than this will not be drawn. Must be greater than clip left x |
|---|---|---|---|
| 64-66h | TXE String Address | Linear dword address of character indexes and width vectors for string to be drawn. Character indexes are unsigned bytes, width vectors are signed 16 bit words -- and tell the text engine how far to -- move from the start x of one character to the next. Same register as right_y1, right_x1 | "and test the text engine how far to" |

UNITED STATES PATENT AND TRADEMARK OFFICE
CERTIFICATE OF CORRECTION

PATENT NO : 5,734,873

DATED : June 7, 1995

INVENTOR(S) : Mark A. Lobodzinski, Patrick A. Harkin

It is certified that error appears in the above-identified patent and that said Letters Patent is hereby corrected as shown below:

Columns 3 & 4, line 33, (Table I), correct as shown below:

TABLE I
TEXT ENGINE REGISTERS

| Address | Name | Description | Bit Information |
|---|---|---|---|
| 58-5Bh | TXE Font Address | Linear starting dword address (dword address = Byteaddress shifted right by 2 places) of character font set to be used for string operation. Lower 4 bits are ignored, forcing fonts to be aligned in 16 Dword boundaries. Up to 256 characters can be stored in one font. Same register as BLT source address. | 31-0: Linear starting dword address of character font set |
| 5C-5Dh | TXE Destination X | Onscreen X location for text string to be drawn, same register as BLT dest X | 15-0: Legal range -"2048" -- 2Q48 --, + 2047. Onscreen X location for text string to be drawn. Same register as BLT "dext" -- dest -- X |
| 5E-5Fh | TXE Destination Y | Onscreen Y location for text string to be drawn. Register shared with BLT dest Y | 15-0: Legal range -2048, + 2047 |
| 60-61h | TXE Clip Left X | Left Clip location for Text Engine"," --.-- Register shared with right_x0 | 15-0: Legal range -2048, + 2047. Pixels with X coordinates < than "thsis" -- this -- will not be drawn. Must be greater than clip left x. Same register as right_x0 |

UNITED STATES PATENT AND TRADEMARK OFFICE
CERTIFICATE OF CORRECTION

PATENT NO : 5,734,873

DATED : June 7, 1995

INVENTOR(S) : Mark A. Lobodzinski, Patrick A. Harkin

It is certified that error appears in the above-identified patent and that said Letters Patent is hereby corrected as shown below:

Columns 7 & 8, lines 6-53, (the segment of code in the middle of the page), correct as shown below:

```
If (do_bounding_box==1)
    Initialize:CURRENTX=DestX,COUNT=0, RIGHTX=Dest X, LEFTX=Dest X
    Determine the size of the bounding box: (note: RIGHTX is the rightmost drawn pixel +1
    while LEFTX is leftmost drawn pixel.)
    LOOP1:
            Read WV(width vector) and CI(character index) @ string address+COUNT
            Read CW(character width) @ fontaddress + CI*(font pitch)
            if CW>WV then (if CURRENTX+CW>RIGHTX then RIGHTX=CURRENTX+CW)
            else if CURRENTX+WV>RIGHTX then RIGHTX=CURRENTX+WV CURRENTX=CURRENTX+WV
            if CURRENTX<LEFTX then LEFTX=CURRENTX
            if CURRENTX>2048 OR CURRENTX<-2047 then LOOP1DONE
            COUNT=COUNT+1
            if COUNT == char_count then LOOP1DONE
            goto LOOP1

LOOP1DONE:
            if (RIGHTX>clip_right_x-1) RIGHTX=clip_right_x-1
            if (LEFTX<clip_left_x) LEFTX=clip_left_x
            blt_width=RIGHTX-LEFTX Now draw bounding box:
            PERFORM TRANSPARENT BLOCK WRITE FILL BLIT with BG color
                    (note: curx register loaded with BLT "distx" -- destx --, rx register loaded with BLT width)
```

UNITED STATES PATENT AND TRADEMARK OFFICE
CERTIFICATE OF CORRECTION

PATENT NO : 5,734,873            Page 5 of 6

DATED : June 7, 1995

INVENTOR(S) : Mark A. Lobodzinski, Patrick A. Harkin

It is certified that error appears in the above-identified patent and that said Letters Patent is hereby corrected as shown below:

Columns 7 & 8, lines 6-53, (the segment of code in the middle of the page), correct as shown below (this is a continuation of the previous page):

```
Draw text string:
    Initialize: CURRENTX=DestinationX, COUNT=0
    LOOP2:
            write CURRENTX to BLT initial destination x register
            Read WV(width vector) and CI(character index)@string address+COUNT
            Read CW(character width)@fontaddress+CI*(font pitch)
            if (CURRENTX>clip_right_x-1)&(~past_clip_continu e) then LOOP2DONE
            if (CURRENTX>clip_right_x-1) SKIPDRAWING
            if (CURRENTX+CW<clip_left_x)&(~past_clip_continu e) then LOOP2DONE
            if (CURRENTX<clip_left_x) SKIPDRAWING
            if (CURRENTX+CW>=clip_right_x)&(CURRENTX<=clip_l eft_x) then
                    BLT width=clip_right_x-clip_left_x
            else if (CURRENTX+CW>=clip_right_x then BLT width=clip_right_x-CURRENTX
            else if (CURRENTX<clip_left_x) then BLT_width = CW-(clip_left_x-CURRENTX)
            else BLT width = CW
            if (CURRENTX<clip_left_x) then
```

UNITED STATES PATENT AND TRADEMARK OFFICE
CERTIFICATE OF CORRECTION

PATENT NO. : 5,734,873
DATED : March 31, 1998
INVENTOR(S) : Mark A. Lobodzinski, Patrick A. Harkin It is certified that error appears in the above-identified patent and that said Letters Patent is hereby corrected as shown below:

```
          Write fontaddress+CI*(font pitch)+font_offset*32 +
                  clip_left_x-CURRENTX to BLT initial source address
     else write fontaddress+CI*(font pitch)+font_offset*32 to BLT initial source address
     "fo" -- if -- ("CURRENTZ" -- CURRENTX --<clip_left_x) then use clip_left_x as dest x
     else use CURRENTX as dest x
     PERFORM TRANSPARENT SS EXPAND BLITwith FG color
             (note: curx or clx register used as BLT dest x, rx register loaded with BLT width, inter and lx register loaded with
             blt src address)
SKIPDRAWING:
     CURRENTX=CURRENTX+WV
     if CURRENTX>2048 I CURRENTX<-2047 then LOOP2DONE
     COUNT=COUNT+1
     IF COUNT==char_count then LOOP2DONE
     goto LOOP2
LOOP2DONE:
     reset start_bit
```

Signed and Sealed this

Eighth Day of December, 1998

Attest:

BRUCE LEHMAN

*Attesting Officer*      *Commissioner of Patents and Trademarks*